United States Patent [19]

Angle et al.

[11] 4,451,766
[45] May 29, 1984

[54] RADIO FREQUENCY LASER PUMPING SYSTEM

[75] Inventors: Ellwyn R. Angle, Lomita; John L. Wilkerson, Torrance, both of Calif.

[73] Assignee: Hughes Aircraft Company, El Segundo, Calif.

[21] Appl. No.: 373,936

[22] Filed: May 3, 1982

[51] Int. Cl.³ .............................................. H01J 61/56
[52] U.S. Cl. ....................................... 315/248; 372/38; 372/29; 315/267
[58] Field of Search .................. 372/38, 29, 64, 81–83, 372/58; 315/224, 248, 267

[56] References Cited

U.S. PATENT DOCUMENTS

| | | | |
|---|---|---|---|
| 3,521,119 | 7/1970 | Ahmed et al. | 315/248 |
| 3,790,852 | 2/1974 | Bolin et al. | 315/267 |
| 4,383,203 | 5/1983 | Stanley | 315/267 |

Primary Examiner—William L. Sikes
Assistant Examiner—Léon Scott, Jr.
Attorney, Agent, or Firm—W. J. Benman, Jr.; W. J. Bethurum; A. W. Karambelas

[57] ABSTRACT

An improved laser power supply is disclosed. The invention is designed to provide the high electric field required for starting a laser in addition to the capability of automatically readjusting after laser action is initiated to provide an optimum impedance match for high efficiency energy transfer. The invention includes variable means for matching the impedance of a laser cavity with a source of RF energy. In addition, means are provided for sensing a change in the impedance of the laser cavity. The sensed change is then utilized to vary the impedance of the matching elements to provide and maintain an optimal coupling between the laser cavity and the RF source.

10 Claims, 1 Drawing Figure

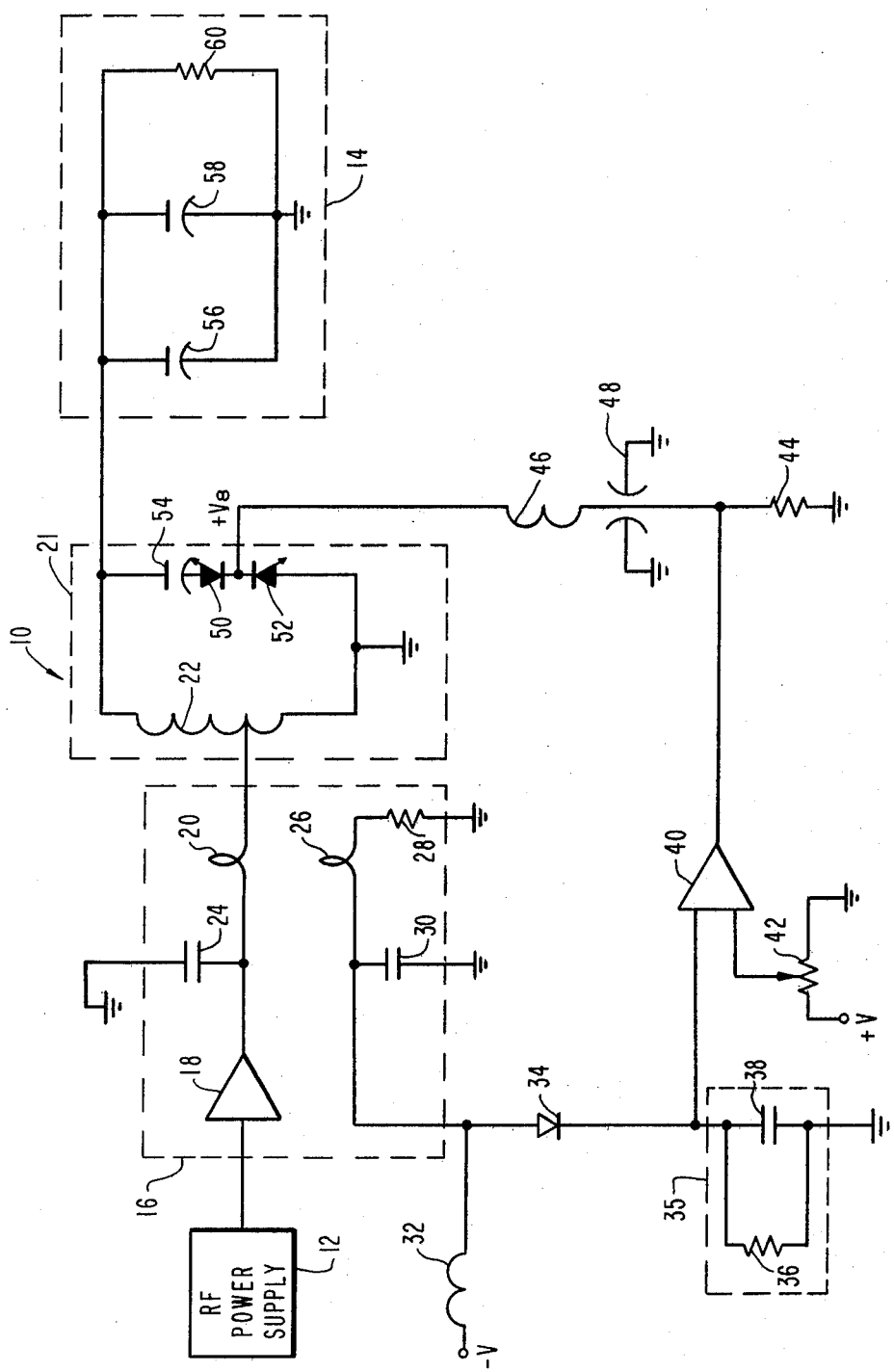

RADIO FREQUENCY LASER PUMPING SYSTEM

BACKGROUND OF THE INVENTION

1. Field of the Invention

This invention relates to laser systems. More specifically, this invention relates to radio frequency pumping systems for high pressure gas lasers.

While the present invention will be described herein with reference to a particular embodiment and a particular application, it is understood that the invention is not limited thereto. Those having ordinary skill in the art and access to the teachings of this invention will recognize additional modifications and applications within the scope thereof.

2. Description of the Prior Art

Early gas laser power supplies where adaptations of discharge lamp and flash tube power supplies such as those shown by Wattenbach (U.S. Pat. No. 3,235,769) and Roebber (U.S. Pat. No. 3,430,159). As shown by Goldsmith (U.S. Pat. No. 3,351,870) these early systems were high voltage DC power supplies incorporating step up transformers, rectifying circuits, vacuum tubes, pulse forming networks and miscellaneous inductors and capacitors.

As high pressure gas lasers were developed, the DC power supplies where found to be inadequate in reliably starting laser action. Moreover, the DC power supplies were too inefficient, unreliable and bulky to adapt to the space born applications of the more modern high pressure gas lasers.

Radio frequency pumping was turned to as one approach to the high pressure gas laser problem. Laakmann (U.S. Pat. No. 4,169,251), for example, shows a gas laser with RF excitation. A typical RF pumped high pressure gas laser requires a high electric field for reliable starting. The field required for starting may be three times higher than that required for running.

Accordingly, prior art RF pumping schemes provided fixed element impedance matching circuits adjusted to provide a comprise between the high field required for starting and the impedance match required for efficient operation. Such circuits typically included an LC resonant circuit with the coil tapped for an impedance step-up of 4:1 for example. In attempting such a compromise, these fixed element circuits could not be optimized for starting nor for efficiency. Thus it has been recognized that there is a need for a high pressure gas laser RF power supply that provides a high electric field for starting and an impedance match between the power supply and the lasing medium for high efficiency energy transfer during steady state operation.

SUMMARY OF THE IVENTION

The shortcomings of the prior art are substantially overcome by the power supply of the present invention. As described more fully below, the present invention is designed to provide the high electric field required for starting in addition to the capability of automatically readjusting after lasing action is initiated to provide an optimum impedance match for high efficiency energy transfer during steady state operation.

The invention includes variable means for matching the impedance of a laser cavity with a source of RF energy. In addition, means are provided for sensing a change in in the impedance of the laser cavity. The sensed change is then utilized to vary the impedance of the matching circuit to provide and maintain an optimal coupling between the laser cavity and the source of RF energy.

BRIEF DESCRIPTION OF THE DRAWINGS

The FIGURE is illustrative of a preferred embodiment of the present invention.

DESCRIPTION OF THE INVENTION

The FIGURE shows a laser 10 incorporating the principles of the present invention. It includes a radio frequency (RF) power supply 12 and an equivalent circuit for a laser cavity 14. The RF power supply 12 is a standard variety in the 500 to 100 watt class. The preferred embodiment of the present invention is shown between the RF power supply 12 and the laser cavity 14. It includes a coupler 16 comprising an amplifier 18 coupled to receive the RF feed from the RF power supply 12. The output of the amplifier 18 is connected to a one turn inductor 20 which is in turn connected to a tap of an inductor 22. A capacitor 24 is connected between the output of amplifier 18 and ground. In addition to the amplifier 18, inductor 20 and the capacitor 24, the coupler 16 also includes a second one turn inductor 26 which is connected to ground via resistor 28 at one end. A capacitor 30 is connected between the other end of the inductor 26 and ground. The coupler output is provided at the junction between the inductor 26 and the capacitor 30. The coupler output is connected to one end of an RF choke 32 which has its other end connected to a source of negative potential (not shown). Also connected to the coupler output is a Shottky or hot carrier detector diode 34. The cathode of the diode 34 is connected to a junction between a resistor 36, a capacitor 38 and one input to a second amplifier 40. The free ends of the resistor 36 and the capacitor 38 are tied to ground. The second input to the amplifier 40 is connected to a variable resistor 42 having one end tied to a source of positive potential (not shown) and the other end tied to ground. The output of the amplifier 40 is connected to a resistor 44 having its free end connected to ground and a second RF choke 46 through a feedthrough capacitor 48. Resistor 44 provides a DC return for the operational amplifier 40. Resistor 42 provides a reference potential for the amplifier 40. The free ends of the feedthrough capacitor 48 are also tied to ground. The free end of the RF choke 46 is tied to a set of varactor diodes 50 and 52. As shown in the FIGURE, the varactor diodes are cathode coupled at the junction with the RF choke 46. The anode of diode 50 is connected to a capacitor 54. The free end of the capacitor 54 and the anode of diode 52 are connected across the ends of the inductor 22. The anode of diode 52 and inductor 22 are also connected to ground. The output of the power supply of the present invention appears at the intersection between capacitor 54 and inductor 22. It is shown connected to the laser equivalent circuit 14 represented by capacitors 56 and 58 and resistor 60. Typical parameters for the components shown in the FIGURE are tabulated below in Table I.

TABLE I

| Component | Value |
|---|---|
| Inductors | |
| 20 and 26 | 1 turn 30nH each |
| 22 | 300 to 500nH |
| 46 | 2.5μ H |
| Capacitors | |
| 24 | 15pf |

TABLE I-continued

| Component | Value |
| --- | --- |
| 30 | 15pf |
| 38 | 200pf |
| 48 | 200pf |
| 50 and 52 | 1 to 2pf |
| 56 | 2 to 3pf |
| 58 | .25 to .5pf |
| Resistors | |
| 28 | 50 Ω |
| 36 | 3K Ω |
| 42 | 10K Ω |
| 44 | 20K Ω |
| 60 | |
| Diodes | |
| 34 | $Z_{RF} = 50\ \Omega$ |
| Amplifiers | |
| 18 | RF Amplifier: 50–100w @ ≈ 150MHz |
| 40 | High Voltage DC OP AMP |

In operation, since the gas discharge has not been initiated, the gas in the laser cavity 14 is not ionized and the laser tube will appear electrically to be a capacitor 56. It will have a capacitance which will be a function of the laser length, electrode width electrode separation, and the dielectric material of the laser bore. The tuned circuit provided by the inductor 22, capacitor 54, and varactor diodes 50 and 52 is preset by capacitor 54 and the equivalent series capacity of varactor diodes 50 and 52 as a result of the electrical bias voltage $+V_B$ at the cathode junction between the varactor diodes 50 and 52. The capacitance of varactor diodes 50 and 52 and capacitors 54 and 56 are resonant with the inductor 22 at the RF frequency driving the laser. Resonance of the circuit 21 assures the maximum voltage at the laser 14 and the laser 14 turns on.

Once lasing action starts, the circuit elements 58 and 60 are added in parallel with the tuned circuit 21 thus lowering the resonant frequency 21 and reducing the loaded Q. The tank circuit 21 is pulled away from resonance, presenting an impedance mismatch to the RF source 12 at the tapped coil 22. The directional coupler 16 senses the increased reflected wave due to the mismatch. The reflected wave represents return loss which it is the object of the present invention to minimize. The coupler in sensing the reflected wave discriminates between forward and reflected power. It provides an output to the diode 34 on the receipt of reflected power. The diode 34 is decoupled from a negative DC potential by the RF choke 32. This allows the diode 34 to be biased at approximately 100 μA of current to provide controllable sensitivity and impedance. The output of the coupler 16 turns on the diode 34 which in turn provides a signal to the low pass filter 35 provided by resistor 36 and capacitor 38. A filtered electrical signal representing the return loss is thereby provided to the amplifier 40 for amplification. It is fed back to the varactor diodes 50 and 52 via RF choke 46 and feedthrough capacitor 48. The RF choke 46 and feedthrough capacitor 48 provide RF isolation allowing the DC signal to be passed to the varactor diodes while decoupling the AC. The voltage $V_B$ is increased by feedback from the amplifier 40 such that the capacitance of varactor diodes 50 and 52 is reduced by an amount equal to the increase in the capacitance 58 of the laser cavity at 14. The circuit is again resonant. The impedance presented to the RF source is again matched with the varactor diodes 50 and 52 clamped at the correct voltage $+V_B$. The circuit will maintain correct bias on the varactor diodes in a direction to resonate the tuned circuit 21. The circuit is thus self stabilizing and will maintain the laser output nearly constant by maintaining the RF drive power constant.

While a preferred embodiment has been described above, it is to be understood that the invention is not limited thereto. Those having access to the teachings of this invention an ordinary skill in the art will recognize modifications within the scope thereof. For example, the decoupling circuits 16 could be replaced with a quarter-wave transmission line to secure the advantages of the present invention without departing from the scope thereof. In addition, a zero bias diode could be utilized in place of the Shottky or hot carrier detector diode utilized in this embodiment. Obviously, other low pass filters and variable resonating circuits could be utilized without departing from the scope of the this invention. It is therefore contemplated by the appended claims to cover and any all such modifications.

What is claimed is:

1. An improved laser power supply including
   variable impedance matching means for matching the impedance of a laser cavity with a source of RF energy;
   means for sensing a change in the impedance of said laser cavity;
   means for changing the impedance of said variable impedance matching means in response to the sensed change in the impedance of said laser cavity;
   whereby the RF source is optimally coupled to said laser cavity to enhance start-up and facilitate an optimal energy transfer.

2. The laser power supply of claim 1 wherein said variable impedance matching means includes a variable capacitor.

3. The laser power supply of claim 2 wherein said means for sensing a change in the impedance of said laser cavity includes a directional coupler.

4. The laser power supply of claim 3 wherein said means for changing the impedance of said variable impedance matching means includes means for providing an amplified RF isolated DC signal to said variable capacitor corresponding to the sensed change in the impedance of said laser cavity.

5. An improved RF laser pumping system for reliably starting and efficiently driving a gas laser, said system comprising:
   variable impedance matching means for matching the impedance of a laser cavity with a source of RF energy, said matching means including a variable capacitor;
   means for sensing a change in the impedance of said laser cavity including a directional coupler;
   means for changing the impedance of said matching means by changing the capacitance of said variable capacitor including means for providing an amplified RF isolated DC signal to said variable capacitor corresponding to the sensed change in the impedances of said laser cavity.

6. The system of claim 5 wherein said means for matching the impedance of said laser cavity is a tuned circuit further including an inductor and a capacitor.

7. The system of claim 6 wherein said means for sensing a change in the impedance of said laser cavity further includes a low pass filter.

8. The system of claim 7 wherein said directional coupler includes a one turn inductor.

9. The system of claim 7 wherein means for changing the impedance of said impedance matching means includes an amplifier, an RF choke, and a feedthrough capacitor.

10. The system of claim 9 wherein said means for sensing a change in the impedance of said laser cavity further includes means for controlling the sensitive and impedance of said low pass filter.

* * * * *